United States Patent [19]

Carver

[11] 3,727,148

[45] Apr. 10, 1973

[54] AMPLIFIER WITH PROTECTIVE ENERGY LIMITER CIRCUIT COMPONENTS

[76] Inventor: Robert W. Carver, 19555 23rd Avenue N.W., Seattle, Wash. 98177

[22] Filed: Jan. 10, 1972

[21] Appl. No.: 216,754

[52] U.S. Cl. .................330/207 P, 330/29, 130/30 R, 330/30 D

[51] Int. Cl. ..............................................H03g 11/08

[58] Field of Search ........................330/207 P, 30, 29

[56] References Cited

UNITED STATES PATENTS 3,564,338 2/1971 Teshirogi ..........................330/207 P

*Primary Examiner*—John Kominski
*Attorney*—Roy E. Mattern, Jr.

[57] ABSTRACT

A direct coupled state high fidelity amplifier incorporates an energy limiting circuit to provide protection against the user accidentally overloading and damaging the amplifier. The energy limiting circuit is designed so that the output transistors of the amplifier cannot be required to carry a specified amount of power for a longer period than would permit their safe operation without damage. This is done by examining and limiting the time integral of the product of voltage and current, i.e., energy, that the output transistors of the amplifier absorb. The result of using the energy limiting circuit is an increase in the efficiency of utilization of the output transistors, which in turn allows for an increase in power supplied by the amplifier to other components of the stereo system, while reducing the number of output transistors required.

5 Claims, 2 Drawing Figures

AMPLIFIER WITH PROTECTIVE ENERGY LIMITER CIRCUIT COMPONENTS

BACKGROUND OF THE INVENTION

It is highly desirable in the field of high fidelity power amplifiers to provide sufficient power to enable sound to be reproduced free of distortion. There are on the retail market now, loudspeakers capable of transmitting any musical sound almost totally free of distortion, if there is sufficient power from an amplifier to properly drive the loudspeakers. Inherent in the design of these top quality stereo speakers is their inefficiency, or need for a large power supply to transmit music over the full range of sound without distortion.

Heretofore, amplifiers that could meet the power requirements of the most inefficient speaker systems have been very costly to manufacture, and as a result very costly to the consumer. The reason for this cost has been due, to a great extent, to the need for many output transistors caused by the limitations of these transistors in absorbing power for transmission.

All amplifiers on the retail market are equipped with some means of preventing the user from accidentally overloading the output transistors while using his equipment, and thus damaging the amplifier. Heretofore, this safety mechanism has been one of two types, either a current limiter or a power limiter. There is a maximum amount of power that each separate transistor can absorb for greatly extended periods of time without suffering damage. Thus the current limiter is the simplest method for providing a safety mechanism, since only one variable is considered, but it is also very limited due to the fact that variations in voltage levels are not considered. This requires that the current limiting device shunt any current whose value multiplied by any voltage value would overload the output transistors with too much power. An improvement in this regard is the power limiting device. Here two variables, current and voltage, whose product is power, are examined, and as long as the product of the current and voltage does not exceed the maximum allowable power limit of the transistors for indefinite periods of time, the power is transmitted safely.

However this does not make for maximum utilization of the transistors, since for short, determined, periods of time they can safely carry more power than the maximum power allowed for extended, indefinite, periods of time. Thus in order to more efficiently use each transistor, and thereby reduce the number of transistors required to produce a specified output level, the energy limiting circuit has been developed. Here three variables are considered; current, voltage, and time, energy being the time integral of power and power equalling voltage times the current. This allows the output transistors to absorb more power, for short periods in the range of safe operation, than is ever absorbed at any time with a current limiter or voltage limiter.

The utilization of the energy limiting circuit allows the number of output transistors to be reduced by as much as two-thirds, while still providing as much power as amplifiers that are equipped with a current limiting safety device or a power limiting, or dissipation, device. Other cost reductions that this makes possible renders the cost of installing and using an energy limiting device negligible by comparison. Prior to this time, no amplifier is believed to have been made available which incorporates an energy limiting circuit to prevent overloading and damage to high fidelity amplifiers, and which thereby also greatly reduces the manufacturing cost of such an amplifier for any given power rating.

SUMMARY OF THE INVENTION

A high fidelity power amplifier is provided with protective energy limiter circuit components, and when so protected, the amplifier is made economically and operates efficiently. It is used in conjunction with loudspeakers, preamplifiers, turntables, and signal sources to reproduce music and speech with an extremely high degree of accuracy. It is also used in communication equipment, experimental research equipment of scientific laboratories, and in applied research equipment of biology, physics, meteorology, and chemistry laboratories. This amplifier having its effective energy limiter circuit components, provides very adequate power to the various types of equipment delineated above. Yet it requires fewer output transistors be installed to obtain like various power ratings, than the number of such transistors required in similar rated power amplifiers. Such reduction, results in a corresponding reduction in manufacturing costs directly associated with the amplifier production. This is achieved through the operation of the energy limiting safety circuit components, instead of relying on a current limiting or voltage limiting safety circuit which heretofore have been used to limit the power being absorbed by the output transistors of the amplifier.

DRAWINGS OF PREFERRED EMBODIMENT

The energy limiting safety or protection circuit components incorporated into the circuits of a dual channel solid state high fidelity amplifier are illustrated in the accompanying drawings, wherein;

FIG. 1, is an overall electrical circuit diagram of a direct coupled, dual channel, solid state amplifier, incorporating energy limiting safety circuit portions; and FIG. 2 is the enlargement of circuit portions serving as energy limiting safety or protection circuit components for one channel, which is part of the overall electrical circuit of the dual channel high fidelity amplifier illustrated in FIG. 1, where two such groups of energy limiting circuit components are illustrated.

DESCRIPTION OF PREFERRED EMBODIMENT

Amplifier Circuit Components

Figures 1, 2:
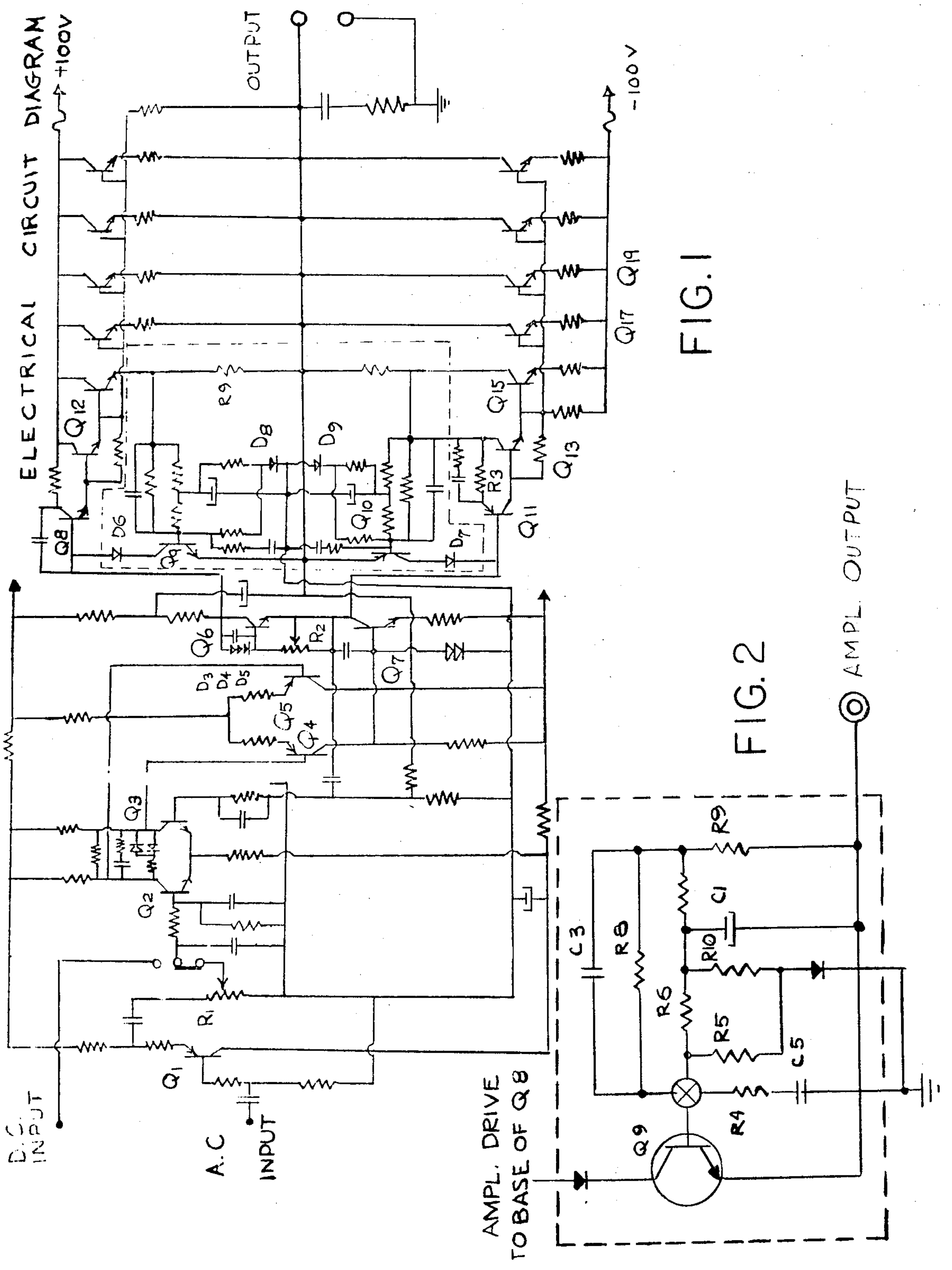

The high fidelity amplifier 10, illustrated in FIG. 1, with some of its energy limiting protection circuit components illustrated again in FIG. 2, is a direct coupled, solid state, dual channel, class B, linear amplifier capable of producing 700 watts of power, root mean square, when each channel is terminated in 8 ohms, complex or resistive. It is capable of producing 350 watts per channel from 0 Hz to 20kHz. It may safely operate into any passive load whose complex impedance may range from zero to infinity. The input signal to be amplified is received by the normal, or by the direct coupled input. The signal is transmitted by transistor Q1 to the top of potentiometer R1. The wiper arm of R1 adjusts the amplitude of the signal to be applied to the base of transistor Q2. Transistors Q2 and Q3 form a voltage differential amplifier also consisting of transistors Q4 and Q5. Transistor Q7 is driven by transistor Q4. The collector of transistor Q7 may swing the full supply voltage. The output of transistor Q7 is applied to the bases of transistor Q8 and Q11 so a complimentary emitter follower action takes place and the output at the emitters of transistors Q8 and Q11 may swing the full voltage supply. Transistor Q6 provides a means of maintaining a stable bias voltage for the output transistors. Diodes D3, D4, and D5 provide a small forward voltage at the base of transistor Q6, which causes it to turn on and maintain a constant voltage between its emitter and collector terminals regardless of the amount of the collector current. Potentiometer R2 permits a small adjustment of this otherwise constant voltage to be made in order that the output transistors may be rendered conducting on receipt of a signal as small as one pleases.

Feedback voltage taken from the output C of the amplifier 10 is applied to the input differential amplifier having transistors Q2 and Q3. This feedback voltage reduces the overall distortion as measured at the output terminal of the amplifier 10.

The output stage of the amplifier 10 consists of six output transistors, Q14 – Q19, two driver transistors, Q12 and Q13, and the two complementary emitter followers transistors Q9 and Q10. As viewed in FIG. 1, the upper output transistors are operated as emitter follower transistors; the lower output transistors are operated as common emitter amplifier transistors. Unity voltage feedback is applied through resistor R3 to the emitter of transistor Q11 so the forward voltage gain assumes a value of one for the combination of transistors Q11, Q13, Q15, Q17 and Q 19.

Energy Limiting Protection Circuit Components

These groups of output transistors in each of the dual channels must be protected and the components of the overall circuit added to provide this protection as shown in FIG. 1 and some as shown in FIG. 2 are the transistors Q9 and Q10, and diodes D6, D7, D8, and D9. They form the active circuit components of the energy limiting protection circuits 12, one for each channel which limit the total energy retained by the output transistors to a safe and pre-determined maximum. These protection circuits 12 are necessary to insure that output transistors will not fail in the event the amplifier overall circuit 10 is accidentally overloaded. The operation of each protection circuit 12, in reference to FIG. 2, where one protection circuit for one channel is illustrated, is as follows. The energy limiter protection circuit 12 develops an output voltage which is an analog representation of the instantaneous silicon chip temperature of the output transistors. When this analog voltage reaches a predetermined threshold, which represents the output device silicon chip temperature and tracks with the energy absorbed, the limiter circuit 12 shunts the drive current around the first driver transistors, thereby preventing the output transistors from experiencing excursions into their unsafe operating region. Current I, which is flowing through resistor R9, develops a voltage across it which is applied to the wiring summing junction A through resistor R8. The time derivative of current I, *dI/dt*, is generated by utilizing the capacitor C3 and it is made effective also at the wiring summing junction A.

The time integral of I, I*dt*, is functionally generated by the combination resistor R7 and capacitor C1 and it is made effective also at the summing junction A by resistor R6. Resistor R10 and switching diode D8 form an integrator reset function by discharging capacitor C1 during negative half-cycles of the waveform of the output circuit portions. Resistor R5 provides a voltage, V, at the wiring summing junction A, which is directly proportional to the voltage across the output transistors or the amplifier output. Since the wiring summing junction A is isolated from the integrating capacitor C1 by resistor R6, a portion of this voltage appears at the junction of resistor R6 and resistor R7 and is integrated by capacitor C1. The value of the total integral is, to a first approximation, the value of VI*dt*, where the limits of integration are chosen to be over one half cycle of the waveform, or by R7C1 seconds, whichever occurs first. If the half period of the waveform is less than R7C1 seconds, the ongoing integration will be stopped by the reset function. If the half period is longer than R7C1 seconds, the integration is stopped when capacitor C1 becomes fully charged at approximately R7C1 seconds. The electrical time constant, R7C1 seconds, is chosen to be approximately the same as the thermal time constant of the silicon chip in each output transistor.

Resistor R4 and capacitor C5 develop a voltage which appears at the wiring summing junction A and is the time derivative, *dv/dt*, of the output voltage. This causes limiting of the output at extreme *dv/dt* rates, such as occurs during high frequency clipping. If the value of any of these voltage quantities, or their sum, exceeds the threshold VBE of transistor, Q9, it turns on, and thereby activates diode D6, whose anode is connected to the base of transistor Q8. This overloading sensing action shunts the drive current away from transistor Q8, preventing any further increase in energy absorption by the output transistors. Consequently, amplifier 10 having energy limiting circuit components provides as much power as other amplifiers having or requiring three times as many output transistors, when protection is obtained either through use of current limiting or power limiting circuit components.

I claim:

1. An energy limiting protection circuit for inclusion in a direct coupled, solid state, amplifier composed of the following: a transistor having connected to its base electrode four resistors and a capacitor in parallel with each other and each separately in series with the transistor; the bottom ends of the said capacitor and one of the said resistors connected in series to the top end of another resistor; the bottom end of another of the first said four resistors connected to another capacitor whose bottom end is connected to ground; the bottom end of the third of the first four said resistors connected to two additional resistors which are in parallel with each other; the bottom end of the first of the two additional said resistors connected to the top end of the resistor which also has the first said capacitor and one of the first four said resistors, connected to its top end, and its bottom end is connected to the amplifier output; the bottom end of the last of the first four said resistors and the bottom end of the second of the two additional said resistors are connected together to form a junction terminal which is also connected to the top end of a diode whose bottom end is connected to ground; a third capacitor not previously mentioned whose bottom end is connected to the amplifier output terminal and whose top end is connected to another junction terminal formed by the connection of the top end of the first of the two said additional parallel resistors, and to the bottom end of the adjacent resistor, which is one of the first said four resistors; the collector electrode of the said first transistor is connected to the cathode end of a diode, whose anode end connects to the amplifier drive; and the emitter electrode of the said first transistor connected to the amplifier output.

2. An energy limiting protection circuit, as claimed in claim 1, in which a transistor has between its base electrode and a remote resistor, a pair of series resistances with a capacitor at their junction connected together to perform an integrating function.

3. An energy limiting protection circuit, as claimed in claim 1, in which a resistor, sensitive to the output voltage swing, is connected to a capacitor in parallel, and is used to discharge the capacitor, thereby resetting the integrator.

4. An energy limiting protection circuit as claimed in claim 1, in which a resistor and a capacitor, connected in series, are used to sense the time rate, *dv/dt*, of the voltage output swing.

5. In combination with an amplifier, an energy limiting protection circuit which develops an output voltage which is an analog representation of the instantaneous silicon chip temperature of amplifier transistors to be protected and when this analog output voltage reaches a predetermined threshold the energy limiting protection circuit diverts incoming driving current around the transistors needing protection, the energy limiting protection circuit, comprising:

a. a resistor to receive current, I, and to develop a voltage at a wiring summing junction;

b. a capacitor to create a derivative of the current, I, *dI/dt* and make it effective at the wiring summing junction;

c. another resistor and another capacitor to generate a time integral of current I, I*dt*, and make it effective at the wiring summing junction;

d. a third resistor to provide a voltage, V, at the wiring summing junction which is directly proportional to the voltage across output transistors of the amplifier;

e. a fourth resistor and another capacitor to create a time derivative *dv/dt* of the output voltage at the wiring summing junction to limit any amplifier output at extreme *dv/dt* rates such as occurs during high frequency clipping;

f. a limiter transistor to be turned on when an extreme condition is occurring; and g. a diode to receive current from this transistor and to conduct it to the base of a drive transistor of the amplifier to shunt the driving current away thereby preventing any further energy absorption by the output transistors of the amplifier.

* * * * *